United States Patent [19]

McGuire

[11] Patent Number: 5,501,434
[45] Date of Patent: Mar. 26, 1996

[54] HYBRID FLUID AND ELASTOMER DAMPER

[75] Inventor: Dennis P. McGuire, Erie, Pa.

[73] Assignee: Lord Corporation, Erie, Pa.

[21] Appl. No.: 241,224

[22] Filed: May 10, 1994

[51] Int. Cl.$^6$ ........................................ F16F 9/04
[52] U.S. Cl. ......................... 267/140.11; 267/141.2; 267/35; 416/140
[58] Field of Search ............ 267/140.11–140.14, 267/35, 219, 220, 141.2, 152; 416/106, 107, 140; 180/300; 188/298, 314, 266, 297, 313, 322.19, 322.5; 248/562, 636; 403/224, 225, 227

[56] References Cited

U.S. PATENT DOCUMENTS

| | | | |
|---|---|---|---|
| 2,102,027 | 12/1937 | Prewitt | 244/18 |
| 2,562,195 | 7/1951 | Lee | 403/224 X |
| 2,936,860 | 5/1960 | Péras | 188/94 |
| 3,625,321 | 12/1971 | Lutz | 188/298 |
| 3,910,720 | 10/1975 | Vincent et al. | 416/145 |
| 3,923,419 | 12/1975 | Mouille | 416/107 |
| 3,999,888 | 12/1976 | Zincone | 416/145 |
| 4,084,668 | 4/1978 | Rybicki | 188/312 |
| 4,105,365 | 8/1978 | Ferris et al. | 416/107 |
| 4,121,812 | 10/1978 | Dousset | 267/35 |
| 4,241,816 | 12/1980 | Hubrecht et al. | 188/298 |
| 4,257,739 | 3/1981 | Covington et al. | 416/134 A |
| 4,297,075 | 10/1981 | Jacobs et al. | 416/14 |
| 4,401,298 | 8/1983 | Eaton et al. | 267/140.1 |
| 4,504,044 | 3/1985 | Shtarkman | 267/35 |
| 4,540,340 | 9/1985 | Pariani | 416/145 |
| 4,549,850 | 10/1985 | Vincent | 416/140 |
| 4,560,042 | 12/1985 | Sell et al. | 188/322.21 |
| 4,566,677 | 1/1986 | LePierres | 267/140.1 |
| 4,596,513 | 6/1986 | Carlson et al. | 416/145 |
| 4,657,232 | 4/1987 | West | 267/35 X |
| 4,728,317 | 3/1988 | Martz et al. | 474/110 |
| 4,753,421 | 6/1988 | Makibayashi et al. | 267/140.1 |
| 4,781,363 | 11/1988 | Braun | 267/225 |
| 4,821,983 | 4/1989 | Aubry et al. | 244/104 FP |
| 4,854,561 | 8/1989 | Kanda | 267/140.1 |
| 4,936,556 | 6/1990 | Makibayashi et al. | 267/140.13 |
| 4,997,009 | 3/1991 | Niikura et al. | 138/30 |
| 5,004,215 | 4/1991 | Aubry et al. | 267/140.1 |
| 5,005,810 | 4/1991 | Sawada et al. | 267/140.13 |
| 5,219,430 | 6/1993 | Antoine | 267/140.12 |
| 5,242,130 | 9/1993 | Mouille et al. | 244/17.13 |
| 5,249,783 | 10/1993 | Davis | 267/217 |
| 5,277,410 | 1/1994 | Oshima et al. | 267/140.11 X |
| 5,284,330 | 2/1994 | Carlson et al. | 267/140.14 |

FOREIGN PATENT DOCUMENTS

| | | | |
|---|---|---|---|
| 255434 | 2/1988 | European Pat. Off. | 248/562 |
| 385416 | 9/1990 | European Pat. Off. | 267/140.12 |
| 1465027 | 11/1966 | France | 416/107 |
| 2202005 | 5/1974 | France | 416/107 |
| 263940 | 8/1988 | Japan | 248/562 |
| 5001742 | 1/1993 | Japan | 267/140.11 |

OTHER PUBLICATIONS

*Fluidlastic® Dampers and Isolators for Vibration Control in Helicopters*, Dennis P. McGuire, presented May 11–13, 1994, American Helicopter Society 50th Annual Forum, Washington, D.C.

*Primary Examiner*—Robert J. Oberleitner
*Assistant Examiner*—Chris Schwartz
*Attorney, Agent, or Firm*—Richard K. Thomson; Randall S. Wayland; James W. Wright

[57] ABSTRACT

A hybrid fluid and elastomer damper. A damper, which may be utilized as a lead-lag damper for a helicopter rotor application, reduces vibratory motion transmitted axially, torsionally and angularly between a pair of components such as a rotor and a blade by hysteresis of the elastomer and throttling and shearing of the fluid through a narrow annular passageway. The hybrid damper captures the best features of both the elastomer and fluid dampers while avoiding many of the disadvantages of each.

18 Claims, 5 Drawing Sheets

HYBRID FLUID AND ELASTOMER DAMPER

BACKGROUND AND SUMMARY OF THE INVENTION

The present invention is directed to improvements in dampers and the like. More particularly, the present invention is a hybrid hydraulic and elastomeric damper which may find application in a helicopter rotor system, for example.

Bonded elastomeric components have been utilized in helicopter vibration control products for many years. Their relative simplicity, light weight, reliability, energy storage capacity, multi-axis spring rate capability and maintenance-free operation, have popularized their usage in helicopter applications such as lead-lag dampers, pylon isolators, landing gear components, stabilator mounts, drive couplings and avionic isolators. Bonded elastomer components are also used in such non-rotary wing applications as vehicle suspensions and impact absorbers.

More recently, hydraulic dampers have been utilized for certain of the helicopter applications including lead-lag dampers and landing gear components. These systems typically employ conventional hydraulic seals/bearings which wear, over time, leading to leaks. Further, some of the systems employ sophisticated valving which adds cost, is subject to blockage or other failure, is highly frequency dependent and susceptible to accelerated wear caused by intrusion of sand and dust. Lastly, when these dampers fail, it is typically as a result of loss of hydraulic pressure leading to total loss of damping. Such a cataclysmic failure can jeopardize the operation of the aircraft.

While bonded components are widely used and have performed exceptionally well, they are not without their limitations in certain applications. For example, lead-lag dampers are constructed of highly damped elastomer in order to be able to provide all the motion damping needed. However, these highly damped elastomers can produce a wide range of stiffness and damping characteristics as a result of variations in strain levels associated with the input disturbance. Further, highly damped elastomers are limited by the level of fatigue strain to which they may be subjected and their lower stiffnesses and loss factors at high amplitudes can be disadvantageous. "Loss factor" is defined as the ratio of damping stiffness, K", to elastic stiffness, K'. In some applications, the low loss factors at low amplitudes attendant the highly damped elastomers can lead to unacceptable limit cycle oscillations. Lastly, the compromises in such properties as tensile strength, tear strength, shear fatigue and creep can limit the practical loss factor of a damper employing highly damped elastomer to around 0.8.

The present invention overcomes the difficulties of the two types of dampers by combining the best features of the bonded elastomer- and hydraulic-type dampers into a single hybrid damper. A pair of annular elastomeric members are bonded to and interconnect first and second concentric cylindrical elements in such a way as to create first and second fluid-containing chambers. These chambers are interconnected by a narrow annular passageway through which the fluid is throttled as movement between the concentric cylinders deforms the elastomeric walls of the respective chambers. A volume compensator is integrated into the design.

Energy is dissipated by means of three distinct modes:
1) the hysteresis of the elastomer;
2) contraction and expansion of the fluid as it is throttled through the annular gap; and
3) shearing of the fluid between the two concentric cylindrical members.

These three damping modes combine to dampen relative axial, torsional and skewing motions between the two components linked by the damper, such as the rotor and the blade of a helicopter, for example. Since a significant portion of the damping is provided by the two fluid modes, the elastomer can be selected for other characteristics, such as strength and shear fatigue, rather than for its high damping.

This hybrid damper, identified as a Fluidlastic® damper, is superior to a conventional hydraulic damper in the following ways:

a) no dynamic seals to wear out or cause leaks;

b) fewer components;

c) no catastrophic loss of damping (gradual, observable change);

d) less frequency-dependence;

e) eliminates need for extremely close manufacturing tolerances;

f) longer, more predictable service life;

g) "fail-safe" system operation since loss of the fluid will not result in total loss of damping (spring restraint and damping of elastomer is still available);

h) sand and grit usually kicked up by operation of a helicopter do not have the adverse effects on performance;

i) can accomodate bending moments across the damper.

The Fluidlastic® damper has the following advantages over a conventional bonded elastomer damper:

a) higher loss factors are available;

b) longer fatigue life;

c) more linear performance;

d) smaller space envelope for equivalent damping or greater damping in an equivalent space;

e) less sensitivity to changes in dynamic characteristics (amplitude);

f) maintains a higher loss factor at low strain levels than highly damped elastomers;

g) less susceptible to creep or to permanent set.

This damper affords a versatile hybrid damper whose fluid and elastomer characteristics can be engineered to provide a wide range of varying design performance criteria enabling it to meet a wide variety of needs.

Various other features advantages and characteristics will become apparent after a reading of the detailed description which follows.

DETAILED DESCRIPTION OF THE PREFERRED EMBODIMENTS

Figure 1:
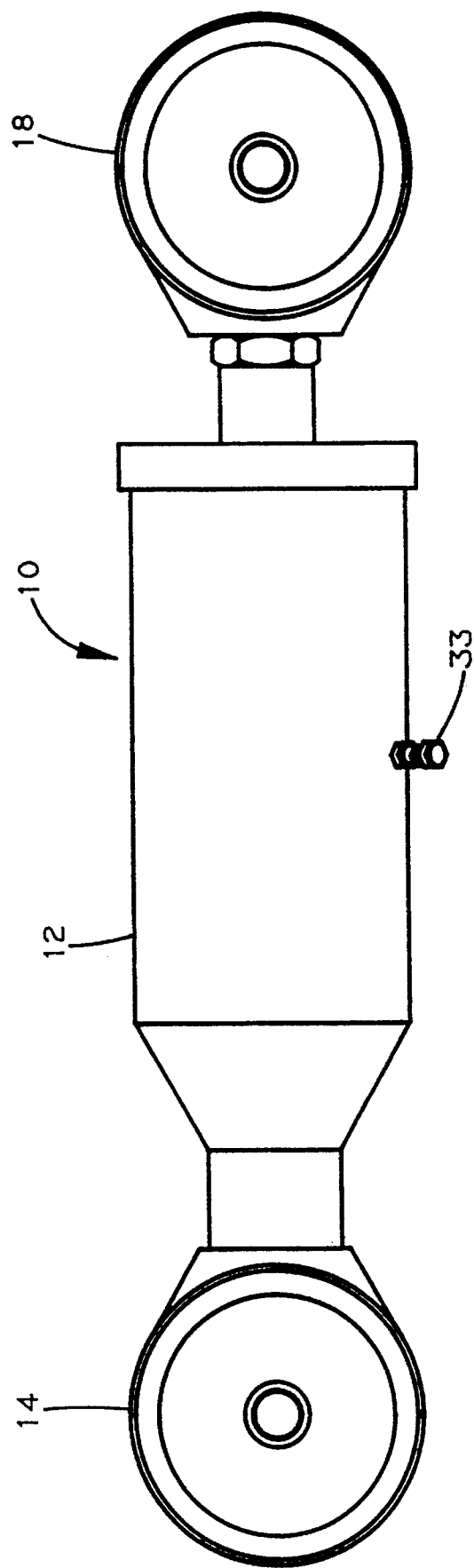
FIG. 1 is a side view of an assembled damper with attachments for interconnecting it to components such as a rotor and blade of a helicopter, for example.
Figure 2:
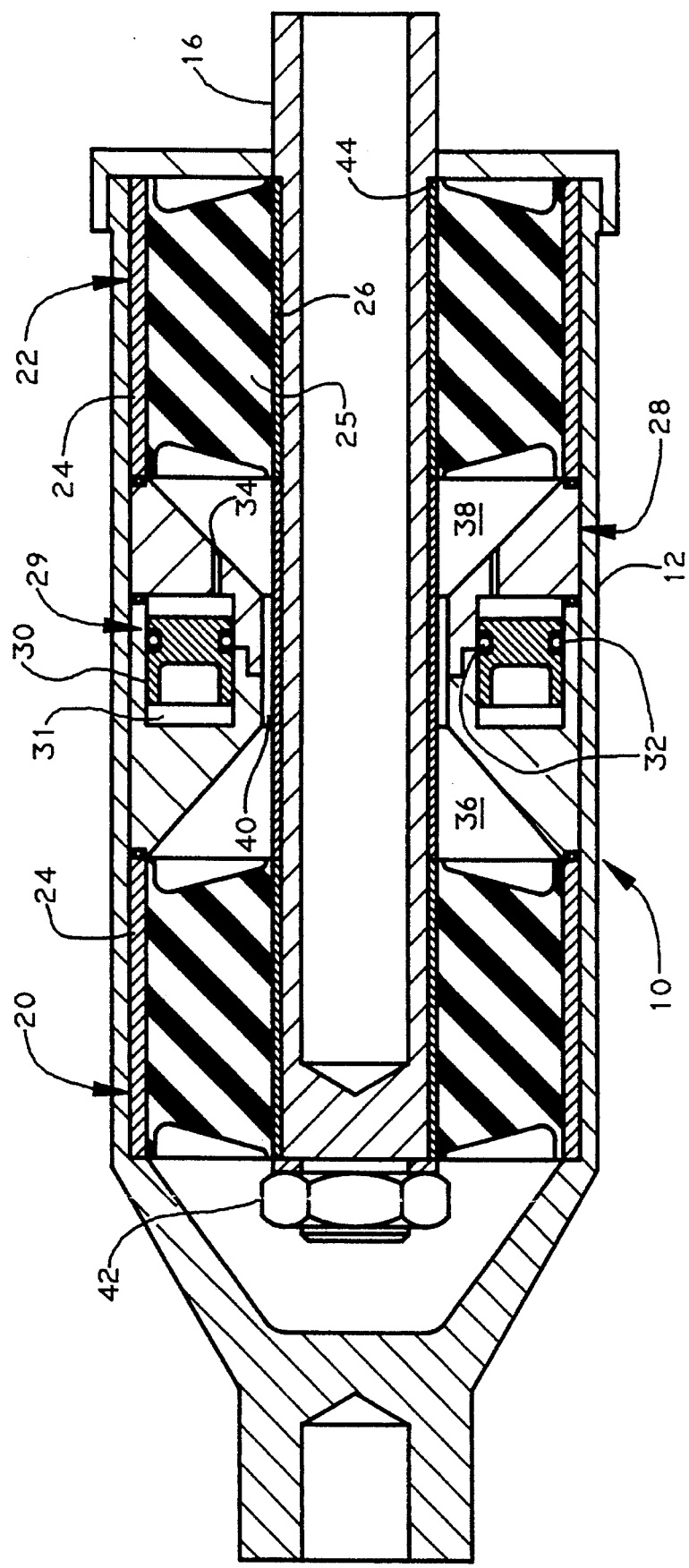
FIG. 2 is a cross-sectional side view of the FIG. 1 embodiment of the present invention.

A first embodiment of the hybrid fluid and elastomer damper of the present invention is shown in FIGS. 1 and 2 generally at 10. A primary cylindrical element, housing 12, has connected thereto by bolting, or the like, a first rod end 14, while second rod end 18 is attached to a secondary cylindrical element, inner tube 16 (FIG. 2), as by threading or the like. First elastomer member 20 and second elastomer member 22 extend between and interconnect primary and secondary cylindrical elements 12, 16. Each elastomer member includes an outer ring 24 and an inner ring 26 bonded to an exterior and interior portion of each elastomer section 25, respectively.

Center segment 28 is an annular volume of revolution formed by rotating a trapezoid about a longitudinal axis. In this embodiment, the trapezoid is an equilateral trapezoid, forming part of outer cylindrical element 12, although other configurations may be employed. Contained within center segment 28 is a volume compensator 29. In this embodiment, compensator 29 comprises an annular piston 30 arranged to float within chamber 31. A pair of o-ring seals 32 prevent fluid movement from one side of piston 30 to the other. The portion of chamber 31 on the backside of piston 30 can be pneumatically pressurized by valve 33 (FIG. 1) while the front side of the piston 30 is interconnected to at least one of fluid chambers 36, 38 by annular passageway 34. First fluid chamber 36 is formed by outer cylindrical element 12, inner cylindrical element 16 and first elastomeric member 20 while second chamber 38 is formed by elements 12, 16 and second elastomeric member 22.

Passageway 34 is dimensioned to dynamically lock chamber 31 from chambers 36 and 38 while permitting hydraulic fluid to flow into chamber 31 against the bias of the initial pneumatic charge as heating of the hydraulic fluid causes it to expand. Additional o-ring seals are provided as necessary to retain the fluid within chambers 31, 36, 38. Annular passageway 40 interconnects fluid passageways 36, 38. Other types of volume compensators may be used as well including rolling diaphragm, metal bellows or the like. Further, while pneumatic spring pressure is preferred for biasing piston 30 to readily permit pressure changes, other types of springs could also be used where such flexibility is not needed.

Securement nut 42 threaded on the end of element 16 captures inner rings 26 against shoulder 44 causing rings 26 to behave as if integrally formed with inner tube 16. Similarly, outer rings 24 and the outer periphery of central segment 28 are clasped together by portions of housing 12 and more integrally therewith. Obviously, the use of outer and inner rings 24, 26 facilitate manufacture and assembly of the elastomeric members 20, 22.

In operation, damper 10 will be used to connect a pair of components (not shown) such as a blade and a rotor. The housing end of damper 10 will be connected to the blade, for example, by rod end 14 while the tube 16 will be attached to the rotor by rod end 18. As the components (blade and rotor) experience relative axial, torsional and skewing movement, these motions will be damped by three distinct modes:

1) the movement will produce energy dissipation in the form of heat (hysteresis damping) from the elastomer;

2) the throttling of the fluid through narrow annular passageway 40 will result in energy losses as the fluid is accelerated/decelerated to and from chamber 36 from and to chamber 38; and 3) the fluid will be sheared between outer cylindrical member 12 and inner cylindrical member 16 resulting in additional energy dissipation (damping). The flexing of the elastomer sections 25 effectively change the size of chambers 36, 38 causing fluid to flow back and forth through annular passageway 40. The damper 10 has a loss factor on the order of 0.85.

Figure 3:
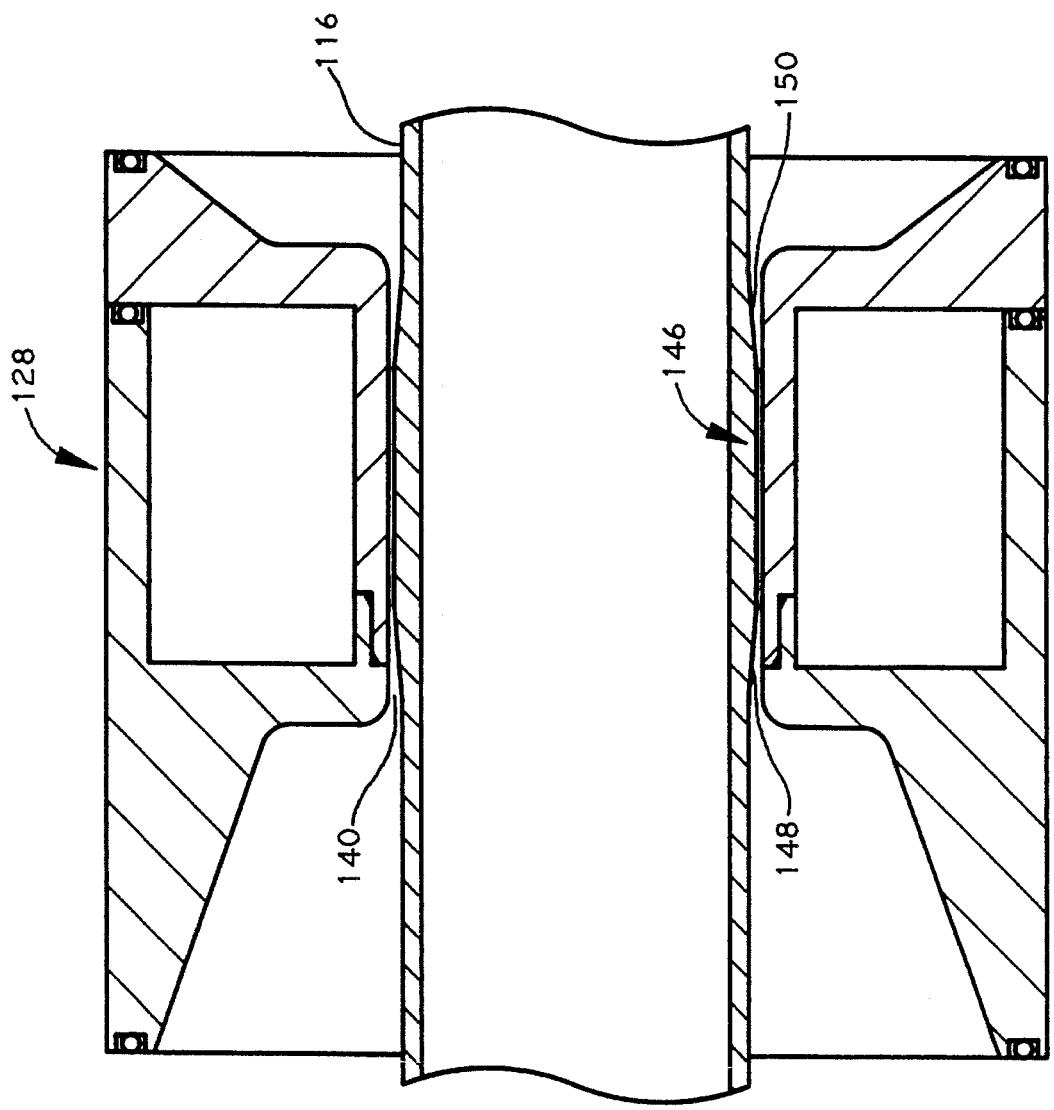
FIG. 3 is an enlarged cross-sectional side view of a center segment of another embodiment of the present invention.
Figure 4:
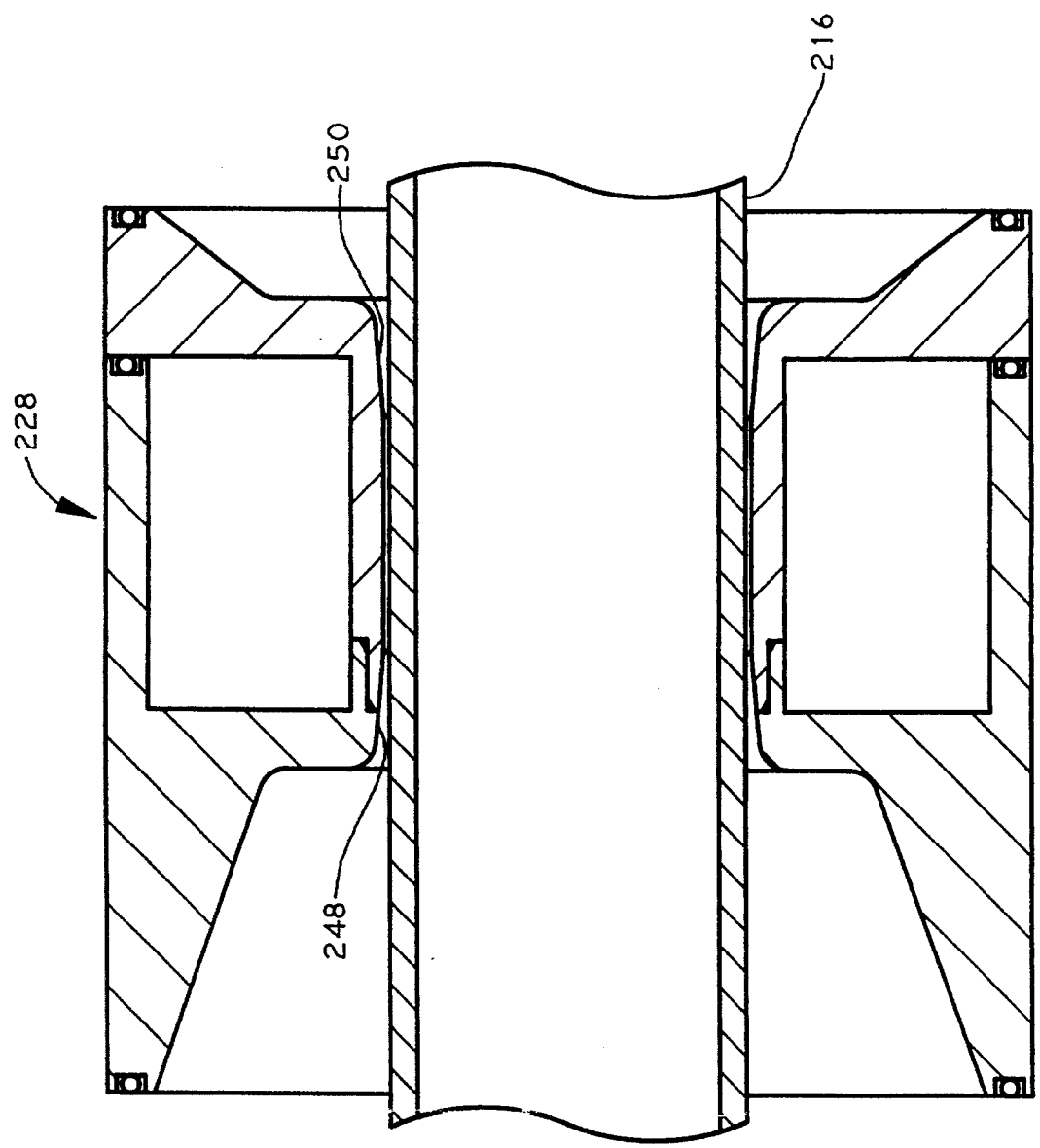
FIG. 4 is an enlarged cross-sectional side view similar to FIG. 3 of a variation of the central segment.

FIGS. 3 and 4 depict second and third embodiments of the present invention in which center sections 128, 228 have unique variations. It is, of course, desirable to avoid contact between the relatively moving elements in order to prevent wear. To that end, in the FIG. 3 embodiment, a bulge 146 is formed on generally cylindrical tube 116 with bulge 146 being tapered at its ends 148, 150. This permits a greater amount of relative skewing motion between tube 116 and its outer cylindrical member without the two elements touching. In addition, the tapered ends 148, 150 provide far more gradual transitions for fluid flowing through passageway 140. Lastly, the taper permits the damper to accomodate bending moments across the damper. In the third embodiment of FIG. 4, the tapered portions 248 and 250 are provided on the outer element of central segment 228. This embodiment is a functional equivalent of the FIG. 3 embodiment.

Figure 5:
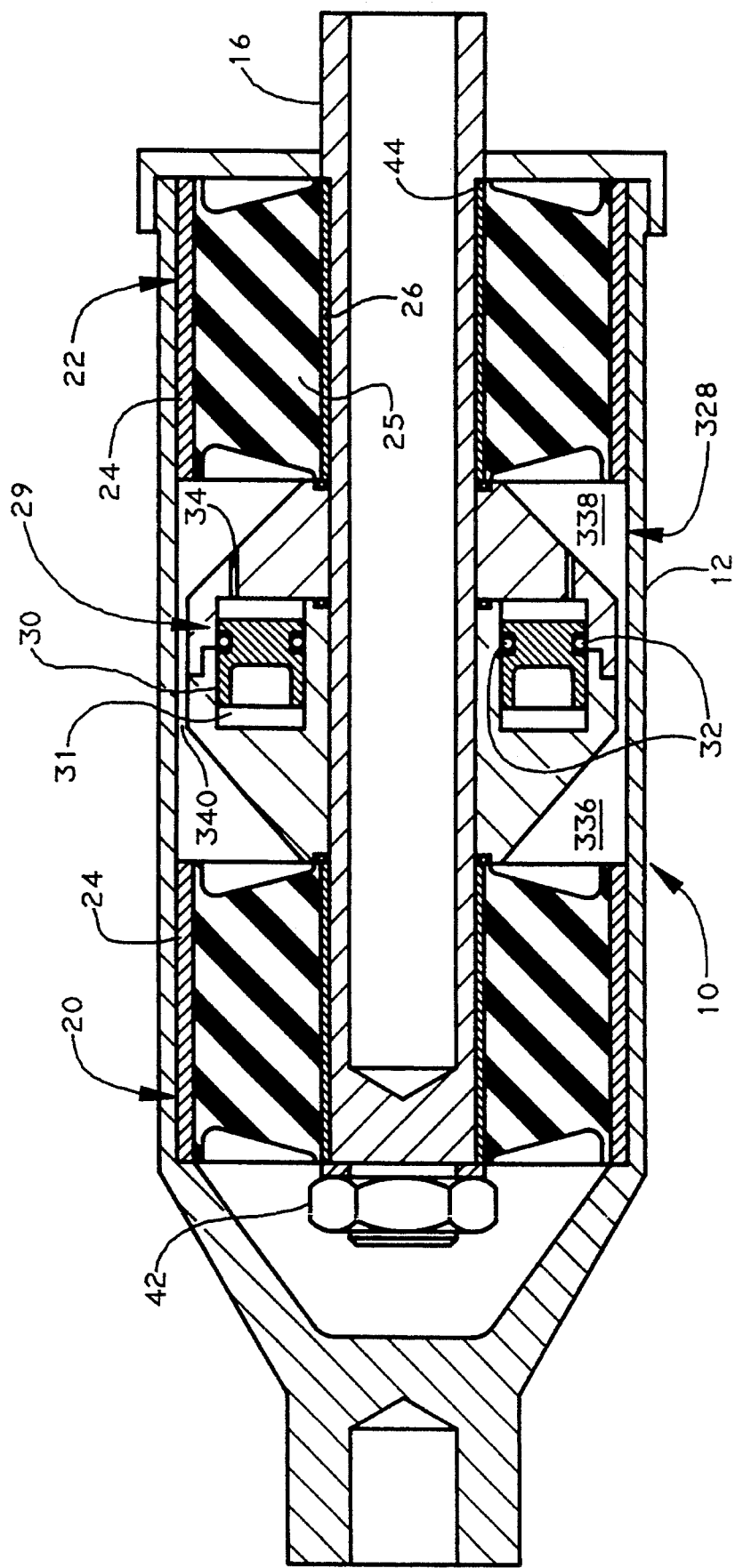
FIG. 5 is a cross-sectional side view of a fourth embodiment of the present invention in which the annular passageway is proximate the interior of the housing.

FIG. 5 depicts a fourth embodiment in which fluid passageway 340 is adjacent the outer housing interconnecting chambers 336, 338. Note the trapezoid used to form the article of rotation is not equilateral in this embodiment and is attached to the inner, rather than outer, generally cylindrical member placing the passageway proximate the housing.

The damper 10 of the present invention has been demonstrated to be highly effective in dissipating vibrational, translational and rotational energy in such demanding environments as lead-lag dampers of articulated helicopter rotor systems. It will be appreciated that the present invention could be utilized in a variety of other applications as well, including hingeless rotor systems, landing gear, suspension systems and energy absorbers.

Various changes, alternatives and modifications will become apparent to one of ordinary skill in the art following a reading of the foregoing detailed description. For example, while the inner and outer members have been described as being generally cylindrical, it will be appreciated that other configurations including round non-concentric, square, triangular, and ovoid could be implemented as well. It is intended that all such changes, alternatives and modifications as fall within the scope of the appended claims be considered part of the present invention.

What is claimed is:

1. A helicopter rotor system having a lead-lag damper operatively interconnected between a rotor and a blade, said system comprising:

a) a slender primary generally b) a secondary generally cylindrical element received within said primary cylindrical element;

c) first and second annular elastomeric members interconnecting said primary and secondary cylindrical elements at axially spaced locations, each of said annular elastomeric members having an appreciable thickness relative to their respective diameters;

d) a first fluid-containing chamber at least partially defined by said primary and secondary cylindrical elements and said first elastomeric member;

e) a second fluid-containing chamber at least partially defined by said primary and secondary cylindrical elements and said second elastomeric member;

f) a narrow annular passageway interconnecting said first and second fluid-containing chambers, said annular passageway having a length which is several times its width;.

g) a first connecting means operatively connecting said primary cylindrical element to one of said rotor and said blade;

h) a second connecting means operatively connecting said secondary cylindrical element to the other of said rotor and said blade;

i) a trapezoidally shaped annular protrusion formed upon and extending from a first one of said primary and secondary generally cylindrical elements toward and proximate the second one of said primary and secondary cylindrical elements to partially define said annular passageway;

whereby relative axial motion between said rotor and said blade causes deformation of said elastomeric members causing significant hysteresis damping in said elastomeric members as well as fluid flow between said first and second fluid-containing chambers through said narrow annular passageway resulting in throttling and shearing of said fluid such that said relative motion is damped by a combined force generated by said elastomer and said fluid.

2. The system of claim 1 wherein a base portion of said trapezoidally shaped annular protrusion is attached to said primary cylindrical element.

3. The system of claim 2 wherein said trapezoid comprises an equilateral trapezoid.

4. The system of claim 3 wherein a parallel surface opposite said base defines one of two surfaces defining said annular passage.

5. The system of claim 4 wherein said annular protrusion has an orifice therethrough interconnecting a first chamber of said volume compensator with said fluid-containing chambers, said orifice being dimensioned to dynamically isolate said first chamber from said fluid-containing chambers, said volume compensator having a second chamber containing a second fluid.

6. The system of claim 5 wherein said volume compensator comprises an annular piston element surrounding and, positioned to travel along, said longitudinal axis of said secondary cylindrical element.

7. The system of claim 1 wherein at least one of two surfaces forming said narrow annular passageway is sloped outwardly away from said opposing surface at least at one end thereof to permit axial misalignment between said primary and secondary cylindrical elements without contact therebetween and to enhance fluid flow.

8. The system of claim 7 wherein said at least one of two surfaces is tapered outwardly away from said opposing surface at both ends thereof.

9. The system of claim 8 wherein said at least one of two surfaces comprises the outermost of said two surfaces.

10. The system of claim 8 wherein said at least one of said two surfaces comprises the innermost of said two surfaces.

11. The system of claim 1 wherein a base portion of said trapezoidally shaped annular protrusion is attached to said secondary cylindrical element.

12. The system of claim 11 wherein said trapezoid is a non-equilateral trapezoid.

13. The system of claim 11 wherein said volume compensator comprises an annular piston element surrounding and, positioned to travel along said longitudinal axis of said secondary cylindrical element.

14. The system of claim 1 further comprising a volume compensator contained within said annular protrusion.

15. A damper for interconnection between a pair of components, said damper comprising:

a) a slender primary generally cylindrical element;

b) a secondary generally cylindrical element received within said primary cylindrical element;

c) first and second annular elastomeric members interconnecting said primary and secondary cylindrical elements at axially spaced locations, each of said annular elastomeric members having an appreciable thickness relative to their respective diameters;

d) a first fluid-containing chamber at least partially defined by said primary and secondary cylindrical elements and said first elastomeric member;

e) a second fluid-containing chamber at least partially defined by said primary and secondary cylindrical elements and said second elastomeric member;

f) a narrow annular passageway interconnecting said first and second fluid-containing chambers, said annular passageway having a length which is several times its width;

g) a first connecting means for operatively connecting said primary cylindrical element to one of said pair of components;

h) a second connecting means for operatively connecting said secondary cylindrical element to the other of said pair of components;

i) a trapezoidally shaped annular protrusion formed upon and extending from a first one of said primary and secondary generally cylindrical elements toward and proximate the second one of said primary and secondary cylindrical elements to partially define said annular passageway;

whereby relative axial motion between said pair of components causes deformation of said elastomeric members causing significant hysteresis damping in said elastomeric members as well as fluid flow between said first and second fluid-containing chambers through said narrow annular passageway resulting in throttling and shearing of said fluid such that said relative motion is damped by a combined force generated by said elastomer and said fluid.

16. The damper of claim 15 further comprising a volume compensator contained within said annular protrusion.

17. The damper of claim 15 wherein a base portion of said trapezoidally shaped annular protrusion is attached to said primary cylindrical element.

18. The damper of claim 15 wherein a base portion of said trapezoidally shaped annular protrusion is attached to said secondary cylindrical element.

* * * * *

UNITED STATES PATENT AND TRADEMARK OFFICE
CERTIFICATE OF CORRECTION

PATENT NO. : 5,501,434
DATED : March 26, 1996 ~~1994~~
INVENTOR(S) : Dennis P. McGuire It is certified that error appears in the above-indentified patent and that said Letters Patent is hereby corrected as shown below:

IN THE CLAIMS
Column 5
Claim 1, line 4, after "generally", insert --cylindrical element--.

Signed and Sealed this

Eleventh Day of June, 1996

*Attest:*

BRUCE LEHMAN

*Attesting Officer*     *Commissioner of Patents and Trademarks*